(12) United States Patent
Buhmann et al.

(10) Patent No.: US 11,084,417 B2
(45) Date of Patent: Aug. 10, 2021

(54) METHOD AND SYSTEM FOR THE AUTOMATIC ADJUSTMENT OF AN ANGLE OF INCLINATION OF A VEHICLE HEADLIGHT

(71) Applicant: Robert Bosch GmbH, Stuttgart (DE)

(72) Inventors: Alexander Buhmann, Reutlingen (DE); Tomislav Pozaic, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 16/137,718

(22) Filed: Sep. 21, 2018

(65) Prior Publication Data

US 2019/0092223 A1 Mar. 28, 2019

(30) Foreign Application Priority Data

Sep. 25, 2017 (DE) .......................... 102017216945.1

(51) Int. Cl.
*B60Q 1/10* (2006.01)

(52) U.S. Cl.
CPC .......... *B60Q 1/10* (2013.01); *B60Q 2300/114* (2013.01)

(58) Field of Classification Search
None
See application file for complete search history.

(56) References Cited

U.S. PATENT DOCUMENTS

| | | | | |
|---|---|---|---|---|
| 8,858,046 B2 * | 10/2014 | Yamazaki | .............. | B60Q 1/115 362/465 |
| 9,096,171 B2 * | 8/2015 | Kasaba | .................. | B60Q 1/115 |
| 2015/0367771 A1 | 12/2015 | Robert-Landry | | |
| 2016/0001695 A1 * | 1/2016 | Fennelly | .................. | G01C 9/08 701/49 |
| 2016/0288698 A1 * | 10/2016 | Foltin | ....................... | B60Q 1/10 |
| 2017/0151902 A1 * | 6/2017 | Watano | .................... | B60Q 1/10 |
| 2017/0327030 A1 * | 11/2017 | Kim | ......................... | B60Q 1/24 |
| 2020/0198525 A1 * | 6/2020 | Mueller | ................. | H05B 45/10 |

FOREIGN PATENT DOCUMENTS

DE 102013221926 A1 4/2015

* cited by examiner

*Primary Examiner* — Nicholas K Wiltey
(74) *Attorney, Agent, or Firm* — Norton Rose Fulbright US LLP; Gerard Messina

(57) ABSTRACT

A method for the automatic adjustment of an angle of inclination of a vehicle headlight, having the steps: continuous measurement of a rate of rotation of the vehicle headlight; calculation of a change of a gravitational acceleration vector of the vehicle headlight in the coordinate system of the vehicle headlight, using the measured rate of rotation; calculation of an angle of inclination correction using the change of the gravitational acceleration vector; and adjustment of the angle of inclination of the vehicle headlight using the angle of inclination correction.

10 Claims, 3 Drawing Sheets

METHOD AND SYSTEM FOR THE AUTOMATIC ADJUSTMENT OF AN ANGLE OF INCLINATION OF A VEHICLE HEADLIGHT

CROSS REFERENCE

The present application claims the benefit under 35 U.S.C. § 119 of German Patent Application No. DE 102017216945.1 filed on Sep. 25, 2017, which is expressly incorporated herein by reference in its entirety.

FIELD

The present invention relates to a method for the automatic adjustment of an angle of inclination of a vehicle headlight, and to a system for the automatic adjustment of an angle of inclination.

BACKGROUND INFORMATION

Vehicle headlights radiate light at a certain angle of inclination that is measured with reference to a flat ground surface. The precise angle of inclination is often prescribed by law, but can vary as a function of the type of vehicle headlight. For most headlights, the angle of inclination is 1.2%. The radiated light thus declines by 12 cm at a distance of 10 m. Also commonly found are angles of inclination of 1.0%, while fog headlights have larger angles of inclination of 2%.

The actual angle of inclination of the vehicle headlight must not deviate too strongly from the prescribed values during travel. Vehicle headlights that are set too low reduce the range of view of the driver, while headlights set too high may blind other traffic participants.

For this reason, it is necessary to regularly check the angles of inclination of the vehicle headlights, and to readjust them. For this purpose, the headlights are standardly measured in the workshop using special headlight adjusting equipment. The measurement has to be carried out under specified conditions. Thus, the vehicle is placed on a flat surface, the tires must have the prescribed air pressure, and the driver's seat is loaded by a person or a corresponding weight.

As a result, the calibration is relatively complex, and can be carried out only by specialists. Frequently, however, the orientation of the headlights changes during driving. Thus, the degree of filling of the tank, the tire pressure, the loading of the vehicle, the acceleration of the vehicle, and the inclination of the roadway have an influence on the relative orientation between a specified axis through the vehicle and the ground surface. Correspondingly, the angle of inclination can deviate from the specified values during operation.

U.S. Published Patent Application Publication No. US 2015/0367771 A1 describes a method for the automatic adjustment of the angle of inclination of a vehicle headlight, in which accelerations of the vehicle are measured and are used to adjust the angle of inclination.

SUMMARY

The present invention provides a method for the automatic adjustment of an angle of inclination of a vehicle headlight, and a system for the automatic adjustment of an angle of inclination.

According to a first aspect, the present invention accordingly relates to a method for the automatic adjustment of an angle of inclination of a vehicle headlight, a rate of rotation of the vehicle headlight being continuously measured. The change in a gravitational acceleration vector of the vehicle headlight is calculated in the coordinate system of the vehicle headlight, the measured rate of rotation being used for this. In addition, a correction of the angle of inclination is calculated using the change in the gravitational acceleration vector. The angle of inclination of the vehicle headlight is adjusted using the angle of inclination correction.

According to a second aspect, the present invention accordingly relates to a system for the automatic adjustment of an angle of inclination, having a headlight of a vehicle having an adjustable angle of inclination and having a sensor device that measures a rate of rotation of the vehicle headlight. Using the measured rate of rotation, a computing device calculates a change of a gravitational acceleration vector of the vehicle headlight in the coordinate system of the vehicle headlight. Using the change of the gravitational acceleration vector, the computing device further calculates an angle of inclination correction. A control device adjusts the angle of inclination of the vehicle headlight using the angle of inclination correction.

Preferred specific embodiments of the present invention are described herein.

The present invention provides a low-cost solution for adjusting the orientation of the headlights. Because the angle of inclination of the vehicle headlight is automatically adjusted, a time-intensive manual adjustment in the workshop can be omitted. In addition, dynamic influences can also be taken into account through the automatic adjustment of the angle of inclination. If the inclination of the headlight changes due to varying tire pressure, high or non-uniform loading, travel over an obstacle, or travel on a hill, then the angle of inclination is reset to a specified value through the adjustment according to the present invention. In this way, an illumination of the roadway is ensured that is always correct, so that the range of view is not reduced and oncoming traffic is not blinded.

According to a preferred development of the example method in accordance with the present invention, an overall acceleration of the vehicle headlight is measured. On the basis of the measured overall acceleration, an error of the measured rate of rotation is calculated and the rate of rotation is correspondingly corrected. The change in the gravitational acceleration vector is calculated taking into account the corrected rate of rotation. The error in the rate of rotation can for example be ascertained by calculating the cross-product of the overall acceleration and the gravitational acceleration vector. In this way, a still more precise adjustment of the angle of inclination is possible.

According to a preferred development of the example method, the overall acceleration of the vehicle headlight is measured, and a linear acceleration of the vehicle headlight is calculated using the measured overall acceleration and the measured gravitational acceleration vector. On the basis of the calculated linear acceleration of the vehicle headlight, a horizontal velocity of the vehicle headlight is calculated. The angle of inclination correction is calculated using the calculated horizontal velocity of the vehicle headlight. In this way, the linear acceleration can be ascertained by subtracting the gravitational acceleration vector from the overall acceleration. Subsequently, the horizontal velocity of the vehicle headlight can be calculated through integration of the linear acceleration.

According to a preferred development of the example method, the angle of inclination correction is calculated on the basis of a comparison of the calculated horizontal velocity of the vehicle headlight with a velocity ascertained on the basis of GPS data. The velocity ascertained on the basis of GPS data is oriented substantially parallel to the roadway. The ratio of the horizontal velocity to the velocity ascertained on the basis of GPS data corresponds to the cosine of the angle of inclination correction.

According to a preferred development of the example method, noise portions are eliminated using a low-pass filter for the calculation of the linear acceleration. In this way, for the calculation of the linear acceleration the gravitational acceleration vector can be subtracted from the measured acceleration, and the result can then be averaged over time using a low-pass filter in order to eliminate noise contributions, in particular white noise. In this way, the precision of the adjustment of the angle of inclination is further improved.

According to a preferred development of the example method, the rate of rotation and/or the acceleration of the vehicle headlight is measured using a sensor device that has a fixed orientation relative to the vehicle headlight. Particularly preferably, the sensor device is fixedly connected to the vehicle headlight. The sensor device can be situated in particular in or on a housing of the vehicle headlight.

According to a preferred development of the example method, an initial acceleration vector can be measured during a calibration of the vehicle headlight under specified normal conditions. The calculation of the change of the gravitational acceleration vector is done relative to the initial gravitational acceleration vector. The "specified normal conditions" can be understood as meaning that the vehicle is stationary on a flat and horizontal, i.e. not sloping, ground surface. The air pressure of the tires is set to specified standard values, and the driver seat is loaded by a person or a corresponding weight. The gravitational acceleration vector is oriented perpendicular to the ground surface. The change in the gravitational acceleration vector is tracked by continuous measurement starting from the initial gravitational acceleration vector. If for example the loading of the vehicle changes but the vehicle nonetheless continues to move on a horizontal ground surface, then the cosine of the angle of inclination correction corresponds to the ratio of the vertical portion of the currently measured gravitational acceleration vector and the magnitude of the initial gravitational acceleration vector.

According to a preferred development of the example system according to the present invention, the sensor device is designed to measure an overall acceleration of the vehicle headlight. Using the measured overall acceleration and the gravitational acceleration vector, the computing device calculates a linear acceleration of the vehicle headlight. The computing device further calculates a horizontal velocity of the vehicle headlight on the basis of the calculated linear acceleration of the vehicle headlight, and calculates the angle of inclination correction using the calculated horizontal velocity of the vehicle headlight.

According to a preferred development of the present invention, the example system has a GPS device for acquiring GPS data, the computing device being designed to calculate the angle of inclination correction on the basis of a comparison of the calculated horizontal velocity of the vehicle headlight with a velocity of the vehicle ascertained on the basis of GPS data.

BRIEF DESCRIPTION OF THE DRAWINGS

In all the Figures, identical or functionally identical elements and devices are provided with the same reference characters.

DETAILED DESCRIPTION OF EXAMPLE EMBODIMENTS

Figure 1:
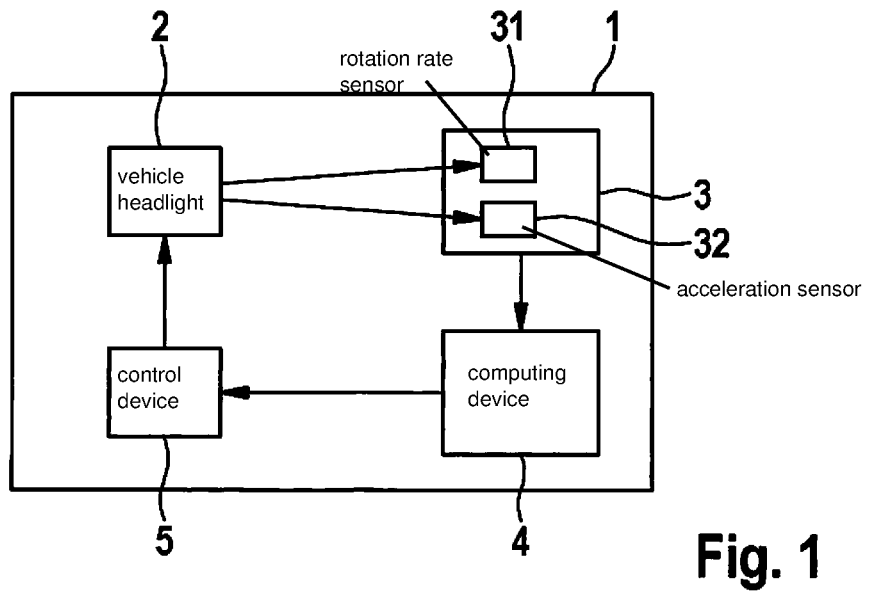
FIG. 1 shows a schematic diagram of a system for the automatic adjustment of an angle of inclination according to a specific embodiment of the present invention.

FIG. 1 shows a schematic diagram of a system 1 for the automatic adjustment of an angle of inclination.

System 1 has a vehicle headlight 2, installed in a vehicle, that has an adjustable angle of inclination.

In or on a housing of vehicle headlight 2, or in the vicinity of vehicle headlight 2, there is situated a sensor device 3 that moves together with vehicle headlight 2, i.e. is spatially fixed relative to vehicle headlight 2.

Sensor device 3 is an initial measuring unit, IMU, having a rotational rate sensor 31 and an acceleration sensor 32. Rotational rate sensor 31 continuously measures the rotational rate components of a rotational rate vector. These can be represented as a four-dimensional quaternionic vector, i.e. in the following form:

$$\omega_m = [0 \; \omega_X \; \omega_Y \; \omega_Z]$$

Acceleration sensor 32 measures the overall acceleration a of vehicle headlight 2, which in turn can be represented as a four-dimensional quaternionic vector.

The sampling rates of rotational rate sensor 31 and of acceleration sensor 32 are preferably equal. Alternatively, the signals having a smaller sampling rate can be linearly interpolated (upsampling), or the signals having the higher sampling rate can be transformed to the lower sampling rate through downsampling. Sensor device 3 can communicate with other devices, such as a GPS device (not shown), via a CAN bus or some other protocol.

System 1 also has a computing device 4 that evaluates the sensor data of sensor device 3. For this purpose, computing device 4 determines the change of the orientation of vehicle headlight 2.

Computing device 4 represents the change in the orientation of vehicle headlight 2 by a quaternionic vector q having corresponding components q_i, i.e. in the following form:

$$q = [q_1 \; q_2 \; q_3 \; q_4]$$

In addition, an initial gravitational acceleration vector, or G vector, g_NORM is specified whose components are given by the corresponding components of the gravitational acceleration of vehicle headlight 2 under specified normal conditions. For the provision of the normal conditions, the vehicle is placed on a flat, horizontal ground surface, the air pressure of the tires is set to specified standard values, and the driver's seat is loaded by a person or a corresponding weight, for example 75 kg. The initial gravitational acceleration vector g_NORM can be represented as a quaternionic vector having real part 0.

All the components of the vectors are preferably indicated in a coordinate system of vehicle headlight 2, i.e. in a coordinate system that rotates together with vehicle headlight 2.

On the basis of the rate of rotation measured by sensor device 3, computing device 4 calculates the change over time of quaternionic vector q. The derivative with respect to time of quaternionic vector q_n for a step n is given by the quaternionic product ⊗ of quaternionic vector q_n−1 at the previous step n−1 with the currently measured rotational rates:

$$\dot{q}_n = \frac{1}{2} \hat{q}_{n-1} \otimes \omega_{m,n}.$$

By integrating these equations, computing device 4 chocolates the value of quaternionic vector q_n:

$$\hat{q}_n = \hat{q}_{n-1} + \dot{q}_n \Delta t.$$

Here, quaternionic vector q_n is normed to 1:

$$\|\hat{q}_n\| = 1.$$

Computing device 4 can take into account a possible error via a pseudo-measurement equation for the calculation of the quaternionic vector.

Using the solution for quaternionic vector q_n, computing device 4 calculates gravitational acceleration vector g_n for step n based on gravitational acceleration vector g_n−1 for step n−1, using the following equation:

$$\hat{g}_n = \hat{q}_n \otimes \hat{g}_{n-1} \otimes \hat{q}^*_n.$$

As initial values for the recursion equations, for quaternionic vector q_0 a real-valued unit quaternion (1, 0, 0, 0) is selected, and for the gravitational acceleration vector the initial gravitational acceleration vector g_NORM is selected.

Optionally, computing device 4 can calculate an error vector e_n through calculation of the cross-product of the overall acceleration a_n measured at step n by acceleration sensor 33 and the gravitational acceleration vector g_n:

$$e_n = a_n \times \hat{g}_n.$$

This error vector e_n can be used by computing device 4 to correct the measurements of rotational rate sensor 31.

Instead of the gradient method just described, a Kalman filter or a comparable algorithm can be used for the calculation of quaternionic vector q_n.

According to a development, system 1 can have a magnetic field sensor that measures a magnetic field in the vicinity of sensor device 3. On the basis of the measured magnetic field, magnetic interfering influences on gravitational acceleration vector g_n can be compensated.

The gravitational acceleration vector has a horizontal, a vertical, and a lateral component that are defined in the coordinate system of vehicle headlight 2. The vertical component is perpendicular to the ground surface when vehicle headlight 2 is correctly oriented. Given a flat ground surface without inclination, the vertical and horizontal components of the gravitational acceleration vector disappear. When there is an incorrect orientation, the orientation of vehicle headlight 2 to the ground surface changes, and the vertical component will in general no longer stand perpendicular to the ground surface. In the following, this component nonetheless continues to be referred to as the "vertical (or perpendicular) component." The same holds analogously for the lateral and horizontal component.

Computing device 4 is designed to calculate a first angle of inclination correction by calculating the arccosine of the quotient of a vertical component of gravitational acceleration vector g_S,n and the initial gravitational acceleration vector g_NORM:

$$\psi_{kor,n} = \cos^{-1} \frac{\hat{g}_{S,n}}{g_{NORM,n}}.$$

System 1 further includes a control device 5 that adjusts the angle of inclination of vehicle headlight 2 using the calculated first angle of inclination correction. In this way, the orientation of vehicle headlight 2 is changed by the first angle of inclination correction, so that the angle of inclination again corresponds to the specified angle of inclination. Control device 5 can deflect vehicle headlight 2 in the vertical and/or horizontal direction.

The described calculation of the first angle of inclination correction provides exact results for a flat roadway. In the case of inclined surfaces, the angle of inclination has to be included in the calculation, because in this case the G vector is no longer perpendicular to the ground surface.

According to a specific embodiment, the adjustment of the angle of inclination of the vehicle headlight can be carried out on the basis of the first angle of inclination correction only if the vehicle is situated on a flat ground surface; i.e., is not traveling up or down an inclined surface. This can be determined for example on the basis of GPS data.

According to a further specific embodiment, the inclination of the roadway can be determined, for example on the basis of GPS data. This inclination of the roadway is included in the calculation for determining the first angle of inclination correction by determining the angle between the G vector and the normal orientation to the roadway.

Optionally, computing device 4 can further be designed to calculate a linear acceleration a_l. The measured overall acceleration a_m corresponds to the sum of linear acceleration a_l, gravitational acceleration vector g, and a noise portion n_a, which can be represented together as quaternionic vectors:

$$a_m = a_l + g + n_a.$$

The noise portion n_a can be eliminated, for example using a low-pass filter. Computing device 4 calculates linear acceleration a_l by subtracting gravitational acceleration vector g from the measured acceleration a_m.

Computing device 4 is further designed to integrate the calculated linear acceleration a_l over time in order to calculate a velocity vector v. Computing device 4 calculates a second angle of inclination correction as the arccosine of the quotient of horizontal component v_H,n of the linear velocity and a further velocity component v_NORM,n:

$$\psi_{kor,n} = \cos^{-1} \frac{\hat{v}_{H,n}}{v_{NORM,n}}.$$

The further velocity component v_NORM,n is preferably extracted from GPS data and corresponds to the velocity of the vehicle ascertained by GPS, and runs substantially parallel to the roadway.

The second angle of inclination correction provides correct results even during travel on a hill.

The GPS data can be used for the plausibilization or improvement of the first angle of inclination correction.

Control device 5 can also adjust the angle of inclination of vehicle headlight 2 using the calculated second angle of inclination correction, instead of using the first angle of inclination correction. In addition, it is possible to combine the first angle of inclination correction and the second angle of inclination correction, and for example to adjust the angle of inclination of vehicle headlight 2 on the basis of an averaged value.

According to a further specific embodiment, the velocity vector v obtained by integration over time of linear acceleration a_l can be observed over a specified time period. The specified time period can for example be some minutes, hours, or days. Velocity vector v is averaged over time. For an optimal adjustment, the averaged value should have the form v=(v_H, 0, 0), i.e. should have only a horizontal component. However, in the case of an incorrect adjustment it will also have a lateral component v_L and a vertical component v_V; i.e., v=(v_H, v_L, v_V). In other words, the "horizontal component" does not run horizontally, due to the rotation. By regulating the angle of inclination of the vehicle headlight, it is set in such a way that velocity vector v has only a horizontal component, i.e., v_L=0 and v_V=0. In this way, a low-cost adjustment is possible, because the evaluation of additional GPS data can be done without.

The adjustment named above is explained in more detail on the basis of the following Figures.

Figure 2:
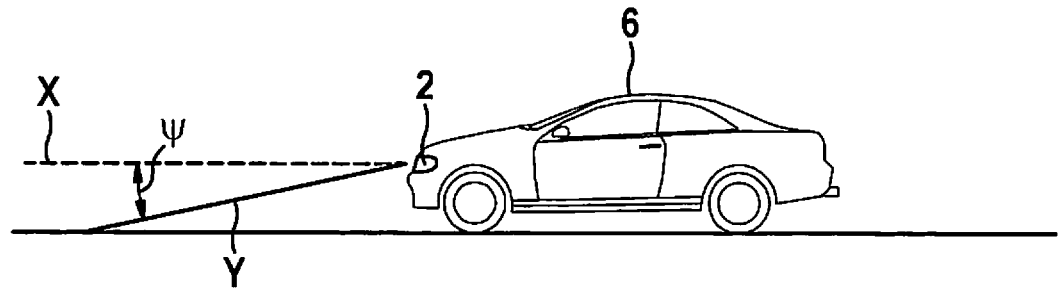
FIG. 2 shows a schematic scenario of a vehicle under normal conditions.
Figure 3:
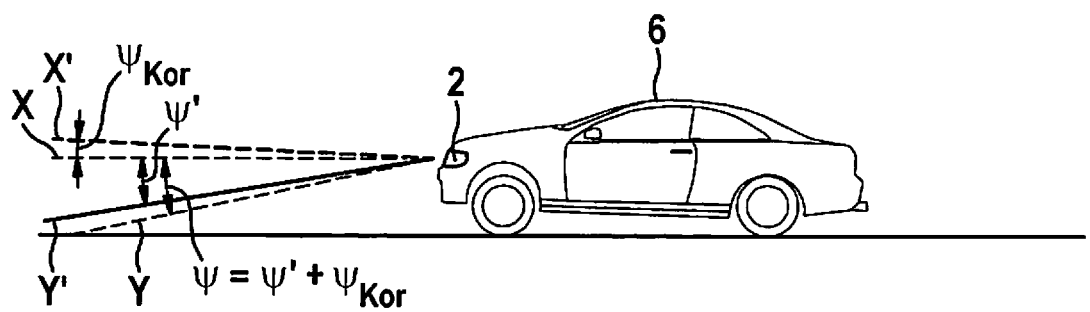
FIG. 3 shows a schematic scenario of a vehicle under conditions deviating from the normal conditions.

Thus, in FIG. 2 a vehicle 6 is shown having a vehicle headlight 2 under normal conditions, i.e. an axis X through the vehicle runs parallel to the surface of the roadway. The light Y emitted by vehicle headlight 2 has an angle of inclination Ψ that is for example 12%.

FIG. 2 shows the same vehicle 6, but here, due to a strong loading, a non-uniform tire pressure, or travel on hilly terrain, axis X' is rotated relative to axis X through vehicle 6 under normal conditions. Correspondingly, angle of inclination Ψ' of vehicle headlight 2 also differs from the correct angle of inclination Ψ under normal conditions. Correspondingly, angle of inclination Ψ' has to be changed by an angle of inclination correction Ψ_kor so that the emitted light Y' is radiated at the same angle to the roadway surface as the light Y emitted under normal conditions.

Figure 4:
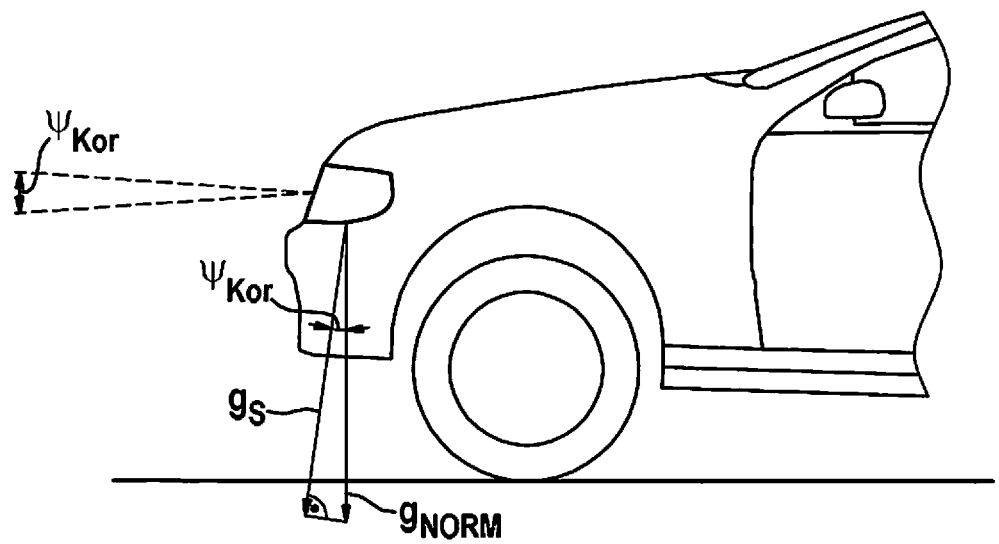
FIG. 4 shows an illustration of the calculation of the angle of inclination correction on the basis of the gravitational acceleration vector.

FIG. 4 shows the vertical component of calculated gravitational acceleration vector g_S as well as the initial gravitational acceleration vector g_NORM. As can be seen from the drawings, the cosine of angle of inclination correction Ψ_kor corresponds to the quotient of the vertical component of the calculated gravitational acceleration vector g_S and the original gravitational acceleration vector g_NORM, in agreement with the calculation of the above-described first angle of inclination correction Ψ_kor. As described above, the direction of the "vertical component" deviates from the normal to the ground surface, due to the incorrect orientation of vehicle headlight 2.

Figure 5:
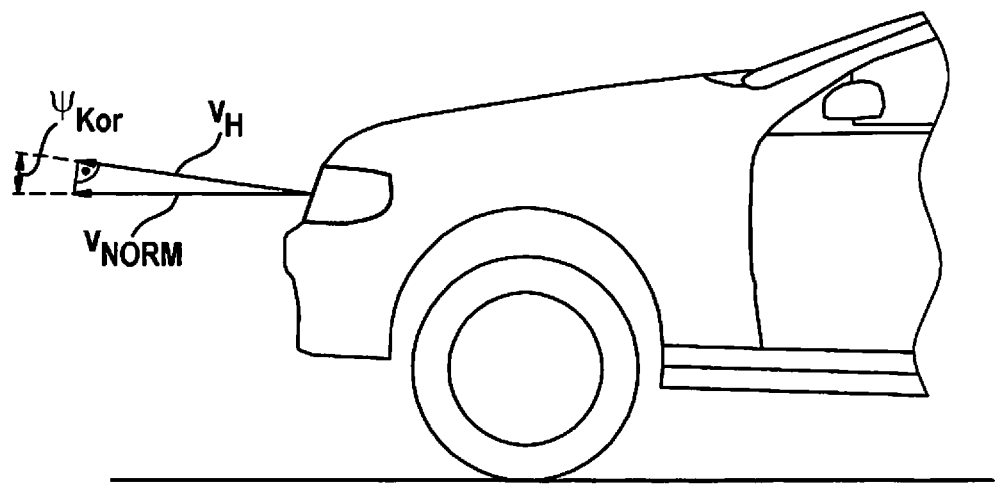
FIG. 5 shows an illustration of the calculation of the angle of inclination correction on the basis of the horizontal velocity.

FIG. 5 shows the horizontal component v_H of the linear acceleration, and the additional velocity v_NORM. The cosine of the angle of inclination correction Ψ_kor corresponds to the quotient of the horizontal component v_H of the linear acceleration and the additional velocity v_NORM, in agreement with the calculation of the above-described second angle of inclination correction Ψ_kor.

Figure 6:
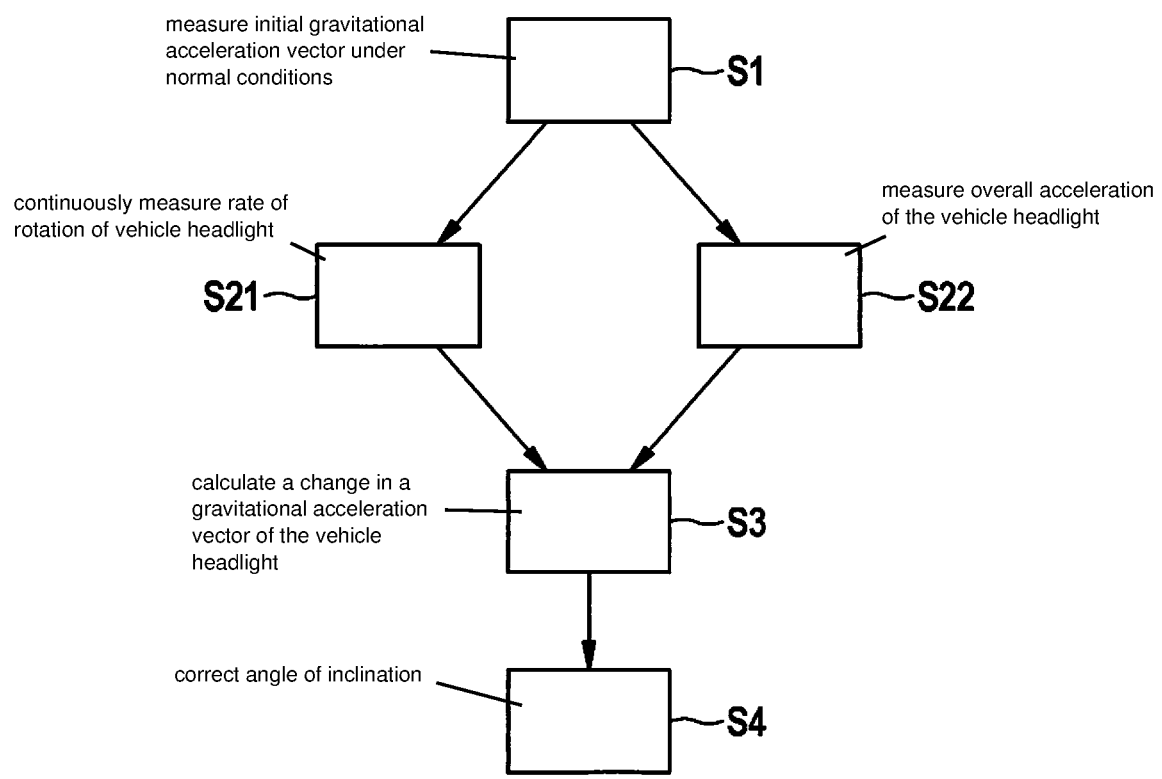
FIG. 6 shows a flow diagram of a method for the automatic adjustment of an angle of inclination of a vehicle headlight.

FIG. 6 shows a flow diagram of a method for the automatic adjustment of an angle of inclination of a vehicle headlight 2.

In a method step S1, an initial gravitational acceleration vector g_NORM is measured under normal conditions.

In a method step S21, a rate of rotation of vehicle headlight 2 is continuously measured. In parallel with this, the overall acceleration of vehicle headlight 2 can optionally additionally be measured, S22.

In a method step S3, a change in a gravitational acceleration vector of vehicle headlight 2 is calculated in the coordinate system of the vehicle headlight, using the measured rate of rotation.

In a method step S4, using the change of the gravitational acceleration vector, an angle of inclination correction is calculated. In particular, a first angle of inclination correction and/or a second angle of inclination correction can be calculated according to the steps described above.

In a method step S5, the angle of inclination of vehicle headlight 2 is adjusted or corrected using the angle of inclination correction.

What is claimed is:

1. A method for an automatic adjustment of an angle of inclination of a vehicle headlight, comprising:
   continuously measuring a rate of rotation of the vehicle headlight and measuring an overall acceleration of the vehicle headlight;
   calculating a change of a gravitational acceleration vector of the vehicle headlight in a coordinate system of the vehicle headlight, using the measured rate of rotation;
   calculating an angle of inclination correction using the change in the gravitational acceleration vector;
   adjusting the angle of inclination of the vehicle headlight using the angle of inclination correction,
   calculating an error of the measured rate of rotation; and
   correcting the rate of rotation based on the measured overall acceleration.

2. The method as recited in claim 1, wherein at least one of the rate of rotation of the vehicle headlight and/or the acceleration of the vehicle headlight is measured using a sensor device that has a fixed orientation relative to the vehicle headlight.

3. The method as recited in claim 1, wherein an initial gravitational acceleration vector is measured during a calibration of the vehicle headlight under specified normal conditions, and the change in the gravitational acceleration vector takes place relative to the initial gravitational acceleration vector.

4. A method for an automatic adjustment of an angle of inclination of a vehicle headlight, comprising:
   continuously measuring a rate of rotation of the vehicle headlight; calculating a change of a gravitational acceleration vector of the vehicle headlight in a coordinate system of the vehicle headlight, using the measured rate of rotation;
   calculating an angle of inclination correction using the change in the gravitational acceleration vector;
   adjusting the angle of inclination of the vehicle headlight using the angle of inclination correction;
   measuring an overall acceleration of the vehicle headlight; calculating an error of the measured rate of rotation; and
   correcting the rate of rotation based on the measured overall acceleration; wherein the change in the gravitational acceleration vector is calculated taking into account the corrected rate of rotation.

5. A method for an automatic adjustment of an angle of inclination of a vehicle headlight, comprising:
   continuously measuring a rate of rotation of the vehicle headlight; calculating a change of a gravitational acceleration vector of the vehicle headlight in a coordinate system of the vehicle headlight, using the measured rate of rotation;

calculating an angle of inclination correction using the change in the gravitational acceleration vector;

adjusting the angle of inclination of the vehicle headlight using the angle of inclination correction;

measuring an overall acceleration of the vehicle headlight;

calculating a linear acceleration of the vehicle headlight being calculated using the measured overall acceleration and the measured gravitational acceleration vector; and calculating a horizontal velocity of the vehicle headlight based on the calculated linear acceleration of the vehicle headlight;

wherein the angle of inclination correction is calculated using the calculated horizontal velocity of the vehicle headlight.

6. The method as recited in claim 5, wherein the angle of inclination correction is calculated based on a comparison of the calculated horizontal velocity of the vehicle headlight with a velocity ascertained on the basis of GPS data.

7. The method as recited in claim 5, wherein noise portions are eliminated using a low-pass filter for the calculation of the linear acceleration.

8. A system for an automatic adjustment of an angle of inclination, comprising:

a vehicle headlight of a vehicle having an adjustable angle of inclination; a sensor device designed to measure a rate of rotation of the vehicle headlight and an overall acceleration of the vehicle headlight;

a computing device designed to calculate a change in a gravitational acceleration vector of the vehicle headlight in a coordinate system of the vehicle headlight using the measured rate of rotation, and to calculate an angle of inclination correction using the change in the gravitational acceleration vector;

a control device that is designed to adjust the angle of inclination of the vehicle headlight using the angle of inclination correction, calculating an error of the measured rate of rotation; and correcting the rate of rotation based on the measured overall acceleration.

9. A system for an automatic adjustment of an angle of inclination, comprising:

a vehicle headlight of a vehicle having an adjustable angle of inclination; a sensor device designed to measure a rate of rotation of the vehicle headlight;

a computing device designed to calculate a change in a gravitational acceleration vector of the vehicle headlight in a coordinate system of the vehicle headlight using the measured rate of rotation, and to calculate an angle of inclination correction using the change in the gravitational acceleration vector; and a control device that is designed to adjust the angle of inclination of the vehicle headlight using the angle of inclination correction, wherein the sensor device is further designed to measure an overall acceleration of the vehicle headlight, and the computing device is designed to calculate a linear acceleration of the vehicle headlight using the measured overall acceleration and the gravitational acceleration vector, to calculate a horizontal velocity of the vehicle headlight on the basis of the calculated linear acceleration of the vehicle headlight, and to calculate the angle of inclination correction using the calculated horizontal velocity of the vehicle headlight.

10. The system as recited in claim 9, further comprising:

a GPS device for acquiring GPS data, wherein the computing device is designed to calculate the angle of inclination correction based on a comparison of the calculated horizontal velocity of the vehicle headlight with a velocity of the vehicle ascertained on the basis of the GPS data.

\* \* \* \* \*